Feb. 22, 1955     F. C. HOFFMAN     2,702,578
DOUBLE ACTING BENDING DIES
Filed Feb. 28, 1951     3 Sheets-Sheet 1
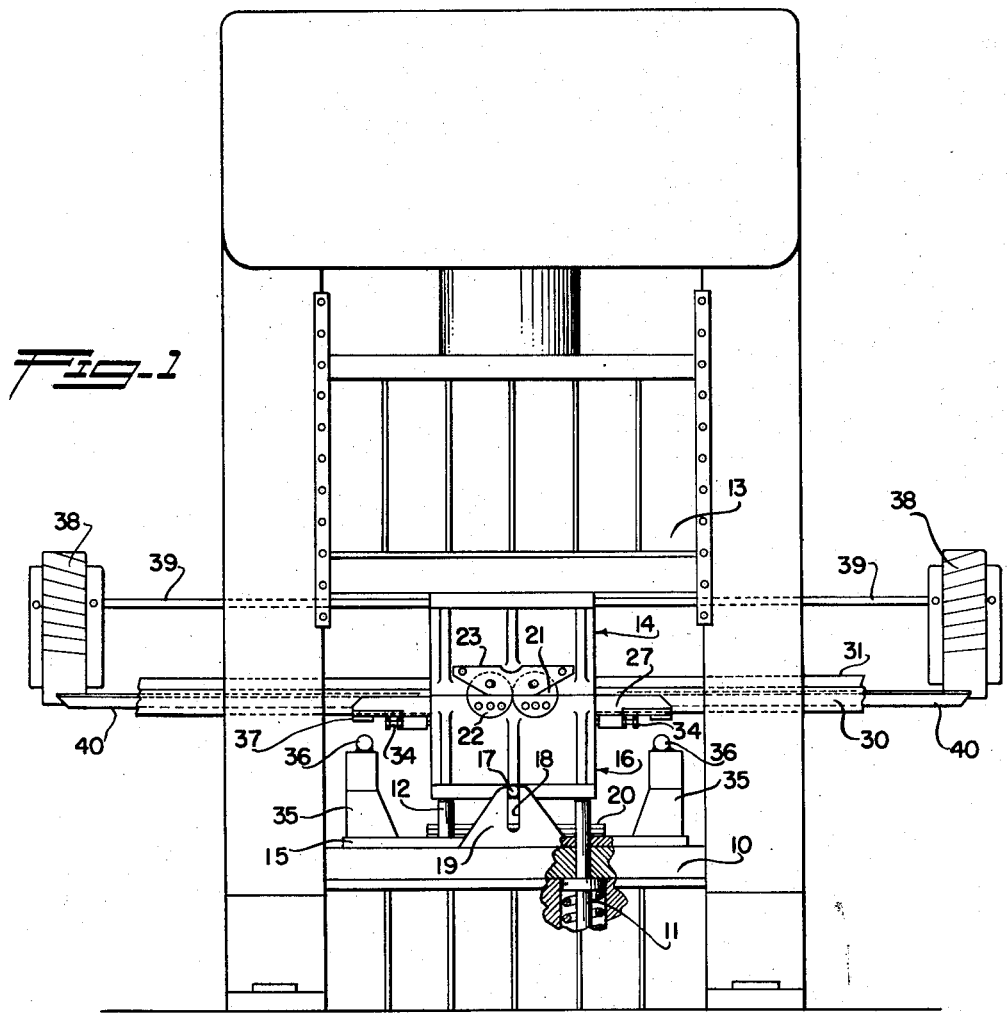
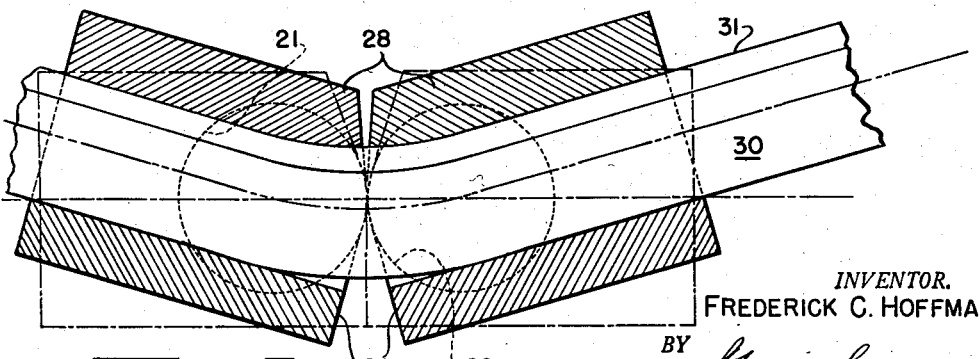
INVENTOR.
FREDERICK C. HOFFMAN
BY
Agent

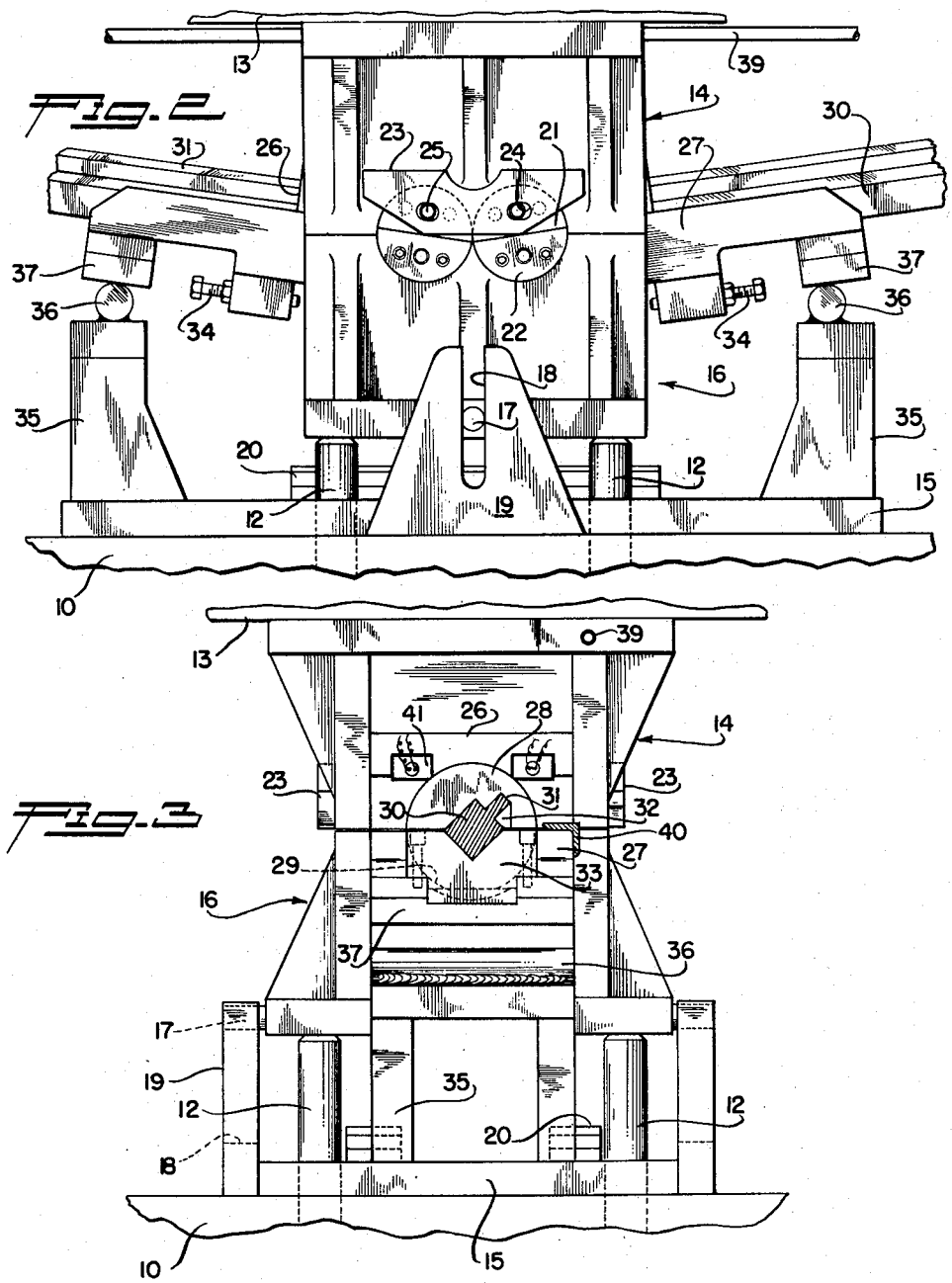

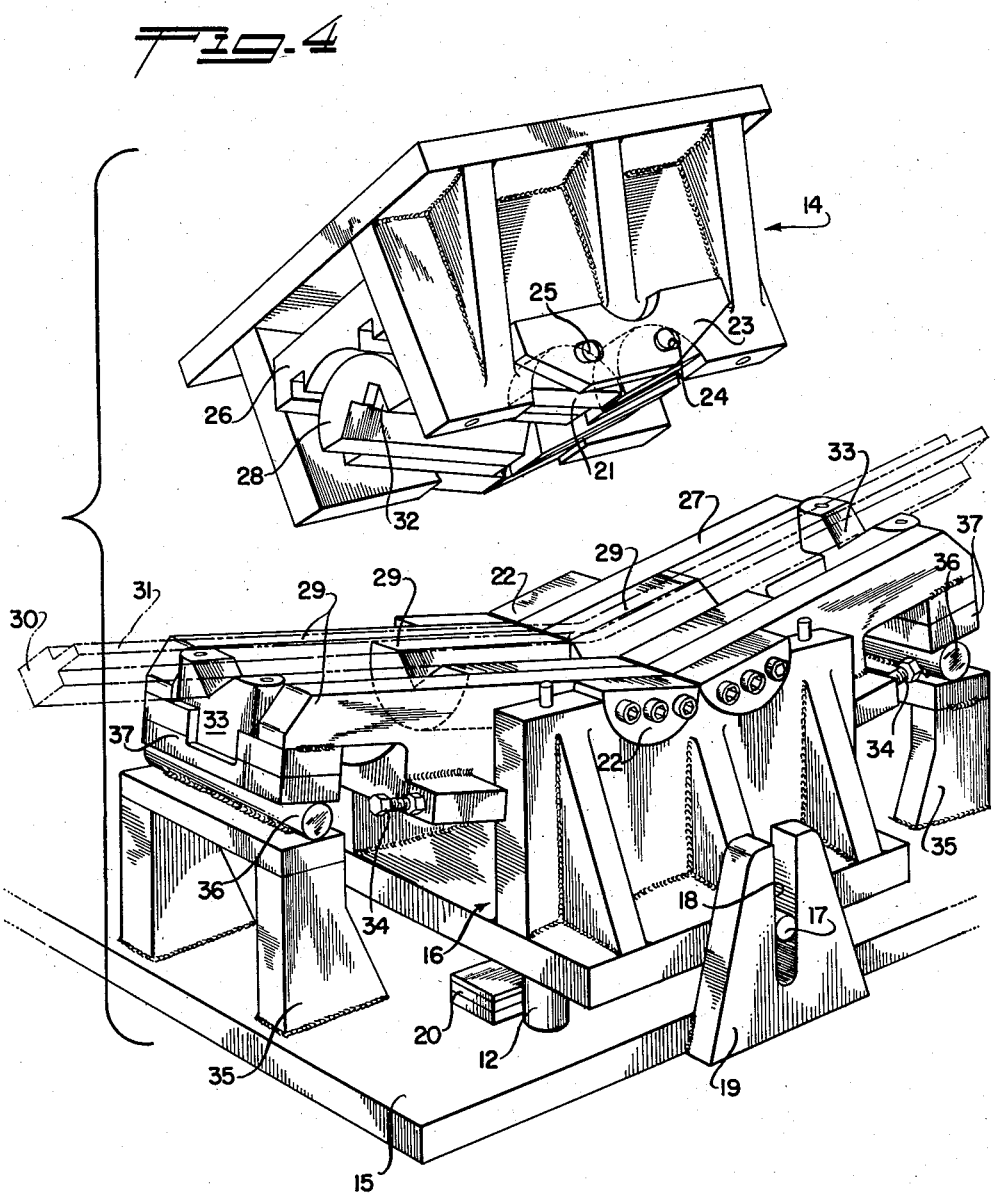

United States Patent Office 2,702,578
Patented Feb. 22, 1955

2,702,578

DOUBLE ACTING BENDING DIES

Frederick C. Hoffman, North Hollywood, Calif., assignor to Lockheed Aircraft Corporation, Burbank, Calif.

Application February 28, 1951, Serial No. 213,096

5 Claims. (Cl. 153—48)

This invention relates to an improved and simplified bending tool for bending heavy sections such as spar caps for built-up airplane wing beams and the like.

As an example of the application of my improved bending tool to a specific item, consideration may be directed to a spar cap for a built-up wing spar extending through the airplane fuselage. Such spar caps are of relatively very heavy section at the center point and are tapered off to much lighter sections at the wing tips. Since the finished wing beam is the backbone of the wing it may be necessary to incorporate dihedral and/or sweep-back by bending the spar caps at their center and perhaps at other points, prior to the assembly of the beam. Also, since wings are usually tapered both in plan and in thickness, either or both of the spar caps must be bent to accommodate both the spar taper and/or the wing taper in plan view. The spar caps are usually milled to the desired section taper in so-called spar mills; and the caps have heretofore been later bent to the required form in arbor presses, by a process of trial and error, until they fit a template having the required angle or angles.

When dealing with heavy sections such as the center of such a spar cap, and particularly when high strength materials are used therein which have restricted ductility, it is highly desirable to form the bend about the neutral axis of the section involved so that the bending stresses will be divided between the fibres of the material subjected to maximum tension and compression.

Also, when bending a deep section, that part thereof on the compression side of the neutral axis is apt to wrinkle or bulge, and this trouble shows up in pronounced form as waviness if there is an outstanding flange on the compression side of the bend. Such flanges are necessary on spar caps, for later attachment to a web disposed between two caps to form a complete wing beam; and has heretofore greatly limited the amount or degree of bend that could be made in such sections. In my improved bending tool I have solved this problem by restraint or confinement of the excess material on the compression side of the neutral axis, and in so doing I can also control the position of the neutral axis of the section being bent, either to center the axis relative to the bend, or to favor the tension side of the section in the event the material has low ductility.

It is accordingly an object of this invention to provide an improved bending tool of general application to formed structural members, wherein the material of the member is confined between closely fitting dies adjacent the region of the bend to be formed, and the dies themselves are rocked or rotated to produce the desired bend in the material confined therein.

It is also an object of this invention to provide an improved and simplified bending tool of the type described that when set up for a particular bend can thereafter reproduce such a bend in production lots with a single stroke of a suitable press, thus eliminating the prior trial and error method for each spar, involved in the use of arbor presses, necessarily operated by highly skilled personnel, who have had to check every bend against a jig or template.

It is a further object of this invention to provide an improved bending tool of the class described having a wide range of capacity for bending varied material sections in single or double bending planes relative to the axis of symmetry, if any of the section, and to a wide range of bending angles in selected planes relative to such axis. Also, inserts may be rotated to compensate for elastic recovery or springback which usually results in this plane if the section is unsymmetrical about the forming axes.

Other objects and features of the invention will be readily understood from the following detailed description of a typical preferred form of the invention wherein reference will be made to the accompanying drawings in which:

Figure 1 is a side view of a hydraulic press on the bed and ram of which a bending tool incorporating the features of my invention has been mounted. The two parts of the bending tool are shown as in contact with each other before actual bending has been started.

Figure 2 is an enlarged view of the bending tool after the bend has been started by lowering the press ram from the position of Figure 1. The member being bent in this view has been twisted to provide bends in planes both normal and parallel to the axis of symmetry of the section of the member being bent, as will more clearly appear from Figure 3.

Figure 3 is an end view of the bending tool of this invention in its closed position prior to actual bending of the spar cap cross section shown in section therein.

Figure 4 is a perspective view of the bending tool of this invention, opened after performing a bending operation on a spar cap member shown therein in dotted lines.

Figure 5 is a diagrammatic longitudinal section through the bending dies which engage the member to be bent.

The particular form of bending tool chosen for illustrative purposes was designed for use in a conventional hydraulic press of the type having a bed cushion instead of a double acting ram. The hydraulic press forms no part of my invention and only the pertinent parts thereof necessary as background for the bending tool will be described herein. The press incorporates a fixed bed 10 having a cushion mechanism 11 therebeneath which acts through rods 12 extending through the bed 10 to give a double action effect to the bending tool. The necessary bending force is derived from a movable head or ram 13 operated by a hydraulic cylinder, not shown, and the hydraulic pressure and resulting force applied to the ram is under the control of the operator.

The illustrated bending tool embodying my invention includes an upper housing 14 mounted on the press ram 13, a bed plate 15 mounted on the press bed 10, and a lower housing 16 supported on the cushion rods 12 and vertically movable relative to the bed plate 15, being centered and guided on the bed plate by pins 17 sliding in notches 18 in guide plates 19. The upper and lower housings meet to form a plane surface or parting line when the ram is operated to lower the upper housing to the position of Figure 1, and further ram movement pushes the lower housing downward, either to a bottoming position against the bed plate, or to some intermediate position such as shown in Figure 2. For ease of reproducing a desired bend less than that obtained by bottoming the lower housing shims 20 may be positioned on the bed plate where the full movement of the lower housing is not required.

Both housings 14 and 16 are transversely bored on an axis located at their parting lines to receive matching or aligned hemispherical pivot arms 21 and 22, the upper pivot arms 21 being retained in the upper housing by end plates 23 having arcuate grooves 24 for retainer pins 25. The pivot arms 21 and 22 in turn support die supporting arms 26 and 27 at right angles to the pivot arms and are grooved to receive circular half dies 28 and 29 which are tailored to receive the particular section form of the member 30 to be bent.

The dies 28 and 29 are best shown in the end view of Figure 3 where a cross section of the member 30 to be bent is shown cocked in order to produce bends in two planes with reference to the nominally vertical wing beam of which the member 30 eventually becomes a spar cap. If the bend were to be in the plane of symmetry of the section of the member 30, as in Figures 1 and 4, then the section of the member would be disposed vertically, and would be sunk into the lower half die 29 until the neutral axis of the section approximately coincided with the parting line of the dies. Where the member cross section is cocked as in Figure 3 and/or when positioned in either half die 28 or 29 so as to involve a re-entrant angle on the compression side of the bend, such as is apparent at the flange 31 of the section, a separate filler piece 32 should be used both to support the flange during bending and to permit removal of the member 30 from the dies after the bending operation.

The lower die supporting arms 27 extend well beyond the sides of the housings, as will appear from Figure 2, and may desirably carry outboard supports 33 for the member in the event the member being bent is so long and flexible as to impose a bending load at the outside edges of the dies 28 and 29.

Normally, the lower die supporting arms 27 are supported horizontally by means of adjustable set screws 34 bearing against the housing. The actual bending operation is accomplished by forcing these supporting arms 27 upwardly relative to their pivot arms. Such bending movements could be accomplished in a number of different ways to be operated by other types of double acting presses. In the illustrated form a pair of abutments 35 are mounted on the bed plate 15 beneath the outer ends of the lower die supporting arms 27. To reduce friction and wear the abutments are topped by a cylinder 36 over which a plate 37 beneath the arms 27 slides and rocks during the bending operation wherein the lower housing 16 is pushed down towards the bed plate, or the shims 20 thereon.

As an aid to maintaining uniformity of bends in production runs, and in compensating for spring-back of the member being bent, a bend indicator may prove helpful. One device suitable for this purpose is shown in Figure 1 where a chart 38 of bend angles is supported from either or both sides of the upper housing 14 by an arm 39, and the lower supporting arms 27 carry arms 40 which serve as pointers moving over the chart. In practice the bend may exceed the specified angle to allow for spring back, and the amount of the spring back can be read on the chart 38 by reducing the pressure on the press ram. If the net bend does not meet specifications the ram pressure can be reapplied to the dies and perhaps increased, to further set the bend to the desired angle, or the shims 20 can be slightly decreased in height to increase the initial degree of bend.

In bending certain alloys, notably 75S aluminum, it may be desirable to heat the dies and member to be bent. Electric heating elements 41 are shown in Figure 3 as a convenient manner of doing so, these elements being turned on after closing the housing and prior to the bending operation, for such period of time as is required to reach the desired temperature in the member being bent.

The operation of the bending tool is relatively simple and easy to understand except for the geometry of the bending dies 28 and 29, which latter will be referred to in more detail hereinafter. The two housings 14 and 16 are separated, for the insertion of a member to be bent, by moving the press head or ram upwardly from the position of Figure 1, thus lifting the upper housing 14. After inserting the member to be bent, the press head or ram is lowered, first to bring the housings together and then to force both downwardly against the resistance of cushion mechanism 11 in the press bed. If the full bend capacity of the tool is not to be used, shims 20 may desirably be inserted between the lower housing 16 and the bed plate.

An explanation of the geometry of the bending dies is helped by reference to Figure 5 wherein the half dies 28 and 29 are shown in section in the bent position. The tangent dotted circles represent the pivot arms 21 and 22 about which the dies move. As shown, the member 30 is vertically disposed in the dies for simplicity. The abutting faces of the upper half dies 28 are rounded off for mechanical clearance as they are pivoted to or beyond the hatched position, and the top surfaces of the cut out for the member 30 are curved, as shown, to give a smooth bend of suitable radius in preference to an abrupt transition at the bend point. It will be noted that the bent area in the member 30 extends between the centers of the pivot arms 21 and 22. Thus the radius of the bent area can be that determined by intersection of lines normal to the die surfaces for a particular degree of bend, thus causing the least practical maximum stresses in the material of the member 30 for a given degree of bend. The use of the bending tool of this invention is not limited to members 30 of the general cross-sectional form shown nor to solid sections but may be applied to widely varying sections, using suitably shaped filler blocks on the compression side of the bend in the event the cross sectional shape requires such localized support and/or to enable the bent section to be removed from the impressions in the dies 28 and 29. It should be noted that the tension side of the bend does not require such support as the compression side does, as on the compression side excess material in the member 30 must be controlled and distributed to prevent bulding in the section or waviness in any flange on the compression or inner side of the bend.

It will thus be seen that I have invented an improved and simplified beam bending tool having provisions for bending heavy sections without distortion of the cross section thereof in the bend area; and whereby smooth transitions are made in the bent area between the adjoining straight sections.

Having described only a typical form of the invention I do not wish to be limited to the specific details herein set forth, but wish to reserve to myself any variations or modifications that may appear to those skilled in the art and/or fall within the scope of the following claims.

I claim as my invention:

1. A bending tool for operation by double acting presses of the cushion bed type comprising a pair of superimposed housings, means supporting the upper housing from the ram of the press, means supporting the lower housing from the cushion bed of the press, a bed plate having guiding means for the lower housing, opposing pairs of die support members carried by each of said housings, transverse pivots for each of said support members, half dies carried by each of said support members, said half dies being grooved to receive at least portions of the cross section of an article to be bent, and means carried by the bed plate and arranged to produce pivotal movement of the die support members in the lower housing when the latter is moved downwardly against the resistance of the cushion bed upon operation of said press.

2. A bending tool of the type described, comprising an upper and a lower housing with a parting line defined therebetween, the housings being arranged to be separately and simultaneously operated by a press or the like, a pair of die support members carried by each housing in abutting relationship at the center of the housings, transverse pivots supporting each member of said pairs of die support members in its housing outboard of the abutting point of the pair, the pivot points of oppositely disposed support members having a common axis on the parting line of the housings split dies conforming to a member to be bent, the mating surfaces of said dies corresponding to the parting line of the housings said dies being mounted on said die support members, and means restraining the outboard ends of said die support members from movement when the housings are simultaneously operated by the press, whereby to bend an article confined within said dies.

3. A bending tool of the type described, comprising an upper and a lower housing with a parting line defined therebetween, the housings being arranged to be separately and simultaneously operated by a press or the like, a pair of die support members carried by each housing in abutting relationship at the center of the housings, transverse pivots having axes lying in the parting line of said housings and supporting each member of said pairs of die support members in its housing outboard of the abutting point of the pair, split dies conforming to a member to be bent, said dies being so constructed and arranged as to center the cross-section of the work with respect to the parting line of the housing said dies being mounted on said die support members, and means restraining the outboard ends of said die support members from movement when the housings are simultaneously operated by the press, whereby to bend an article confined within said dies.

4. A bending tool of the type described, comprising separable top and bottom housings defining a parting plane, the housings being open at their ends, pairs of opposed die members extending through the open ends of both housings, said die members being so formed as to align the neutral axis of the work in the parting plane of the housings transverse pivots common to oppositely disposed members in said housings, and means for tilting said members to bend an article confined between the members.

5. A bending tool of the type described, comprising separable top and bottom housings defining a parting plane, the housings being open at their ends, pairs of opposed die members extending through the open ends of both housings, said die members being so formed as to align the neutral axis of the work in the parting plane of the housings transverse pivots common to oppositely disposed members, the axes of which pivots lie in the parting plane of said housings, and means for tilting said members to bend an article confined between the members.

References Cited in the file of this patent

UNITED STATES PATENTS

| Number | Name | Date |
|---|---|---|
| 520,870 | Winfield et al. | June 5, 1894 |
| 594,142 | Ochse et al. | Nov. 23, 1897 |
| 620,227 | Condon | Feb. 28, 1899 |
| 774,377 | Brinkman | Nov. 8, 1904 |
| 975,184 | Walsh | Nov. 8, 1910 |
| 1,058,775 | McKillop | Apr. 15, 1913 |
| 1,633,744 | Hughes | June 28, 1927 |